United States Patent
Girardin et al.

(12)

(10) Patent No.: US 6,245,212 B1
(45) Date of Patent: Jun. 12, 2001

(54) METHOD OF PROVIDING A METAL BEARING COMPONENT WITH A PATTERN BY ELECTROCHEMICAL MACHINING AND AN APPARATUS THEREFOR

(75) Inventors: Hervé Girardin; Carole Michèle Humbert, both of Joué-les-Tours (FR)

(73) Assignee: SKF Engineering and Research Centre B.V., Mt. Nieuwegein (NL)

( * ) Notice: Subject to any disclaimer, the term of this patent is extended or adjusted under 35 U.S.C. 154(b) by 0 days.

(21) Appl. No.: 09/367,208

(22) PCT Filed: Feb. 11, 1998

(86) PCT No.: PCT/NL98/00086

§ 371 Date: Oct. 28, 1999

§ 102(e) Date: Oct. 28, 1999

(87) PCT Pub. No.: WO98/35779

PCT Pub. Date: Aug. 20, 1998

(30) Foreign Application Priority Data

Feb. 14, 1997 (NL) .................................................... 1005276

(51) Int. Cl.$^7$ ............................... B23H 11/00; B23H 9/00
(52) U.S. Cl. ......................... 205/640; 205/652; 205/666
(58) Field of Search .................................. 205/652, 653, 205/654, 640, 666; 264/224 M

(56) References Cited

U.S. PATENT DOCUMENTS 3,723,269 * 3/1973 Hofling ................................ 205/666
3,880,745 * 4/1975 Shaw ............................ 204/224 M X
4,391,684 * 7/1983 Goddard ....................... 204/224 M X
4,944,856 * 7/1990 Catanese et al. ................. 205/666 X

FOREIGN PATENT DOCUMENTS

| 52-143937 | 11/1977 | (JP) . |
| 2-145800 | 5/1990 | (JP) . |
| A814635 | 3/1981 | (RU) . |
| WO 96/20059 | 1/1996 | (WO) . |

OTHER PUBLICATIONS

Derwent English language Abstract corresponding to JP 52–143937 No date available.

Patent Abstracts of Japan for Japanese Publication No. 02145800. No date available.

* cited by examiner

Primary Examiner—Donald R. Valentine
(74) Attorney, Agent, or Firm—Darby & Darby

(57) ABSTRACT

An apparatus and method for electrochemically machining a texture on a metal bearing component. A ribbon is provided between an electrode and the metal bearing component. The ribbon is flexible, substantially non-conductive and provided with holes. While the ribbon is in direct contact with the metal bearing component, current is passed between the electrode and the metal bearing component. The pattern of the holes in the ribbon determines the pattern electrochemically machined on the surface of the metal bearing component. According to a preferred embodiment the ribbon is an endless belt.

13 Claims, 1 Drawing Sheet

METHOD OF PROVIDING A METAL BEARING COMPONENT WITH A PATTERN BY ELECTROCHEMICAL MACHINING AND AN APPARATUS THEREFOR

BACKGROUND OF THE INVENTION

1. Field of the Invention

The present invention relates to a method of providing a metal bearing component, chosen from the group consisting of a bearing ring, a roller element and a shaft of a dynamic pressure bearing, with a texture by electrochemical machining, wherein a current is passed across a narrow gap formed by said metal bearing component and an electrode means, electrolyte being supplied to the gap.

2. Description of the Related Art

Such a method is known in the art. In particular, WO96/20059 relates to a method of electrochemically machining a bearing ring for providing it with a pattern. According to this patent application an electrode is used having a non-conducting surface provided with a conducting pattern.

This method has the disadvantage that it is not capable of providing a surface with a high-definition pattern.

It is a goal of the present invention to provide a method capable of providing a surface with a high-definition surface pattern.

To this end the method according the present invention is characterized in that a ribbon is provided between the electrode means and the metal bearing component, said ribbon comprising a flexible, substantially non-conductive material provided with holes, wherein said ribbon is over part of its length put in direct contact with the metal bearing component, defining a contact zone, and the current is passed across the gap.

The ribbon serves as a mask, the holes exposing only those parts of the surface of the metal bearing component that are to be electrochemically machined. As the mask is not adhered to the surface, it can be easily removed and reused for treating another part of the surface of the metal bearing component. The part of the ribbon in contact with the metal bearing component The Soviet patent publication SU-A-814635 describes a method of electroabrasive machining a metal object, such as a turbine blade. This method comprises moving an abrasive band along the surface of the object to be treated. The band is perforated, providing holes through which an electrolyte contacts the object to be treated. This publication does not relate to providing the surface with a texture.

SUMMARY OF THE INVENTION

According to a highly preferred embodiment, the method according to the invention is characterized in that said metal bearing component is rotated around its axis while the ribbon moves at the contact zone with the same speed and direction as the metal bearing component.

By rotating the bearing component, while the ribbon moves along with it without substantial slip, the total surface of the bearing ring to be treated can be electrochemically machined in a single step. It goes without saying that the ribbon may be actuated to rotate the bearing component, or the bearing component may be driven to move the ribbon, or both the bearing ring and the ribbon may be actuated.

According to a preferred embodiment a ribbon is used having at least two segments substantially free from holes, said segments being adjacent to a segment comprising holes, said holes-comprising segment having a length equal to the circumference of the bearing component to be machined or a multiple thereof.

In this way one can prevent that some parts of the metal bearing component are treated more often than other parts. A holes-comprising segment with a length of a multiple of the circumference of the bearing component is, for example, suitable if the bearing component is to be provided with a cross-hatched pattern. To produce said pattern said segment first comprises a length with parallel oblong holes followed by a length with parallel oblong holes set at an angle to the oblong holes in the first length.

According to another embodiment, a ribbon is used comprising an indicator means, and a detecting means is used to detect said indicator means giving an output signal depending on the position of the indicator means, which output signal is used to control the current passed over the gap.

This method also offers a way to prevent some parts of the metal bearing component from being treated more often than other parts.

According to a preferred embodiment, a ribbon is used composed of a plastic having a high tensile strength.

Using such a ribbon of plastic having a high tensile strength is very useful for obtaining high-definition patterns without the risk of some parts of the metal bearing component being treated more often than other parts, in addition to which the ribbon is reusable.

According to a further preferred embodiment, a ribbon is used having holes which are narrow at the side of the bearing component and wider at the opposite side of the ribbon.

Holes having this configuration allow for higher current densities and faster removal of metal ions originating from the metal bearing component by electrolyte, speeding up electrochemical machining.

According to an advantageous embodiment, an endless belt is used as the ribbon.

Such a closed loop ribbon allows for repetitive treatment of the surface of the metal bearing component.

Finally the invention relates to an apparatus for electrochemical machining of a metal piece, in particular a bearing component, to provide it with a surface texture, comprising electrode means, means for supplying electrolyte and means for rotatably mounting of the metal piece.

This apparatus is characterized in that the apparatus includes a ribbon comprising a substantially non-conductive material for contact with the metal piece, said ribbon being over at least part of its length provided with holes, allowing electrolyte to contact the metal piece and a current to flow between the metal piece and said electrode.

Thus a simple apparatus is provided, capable of electrochemically machining a variety of metal pieces, and in particular bearing components.

BRIEF DESCRIPTION OF THE DRAWINGS

The present invention will now be explained in more detail by way of example, with reference to the drawing in which.

DETAILED DESCRIPTION OF THE PREFERRED EMBODIMENT

Figure 1:
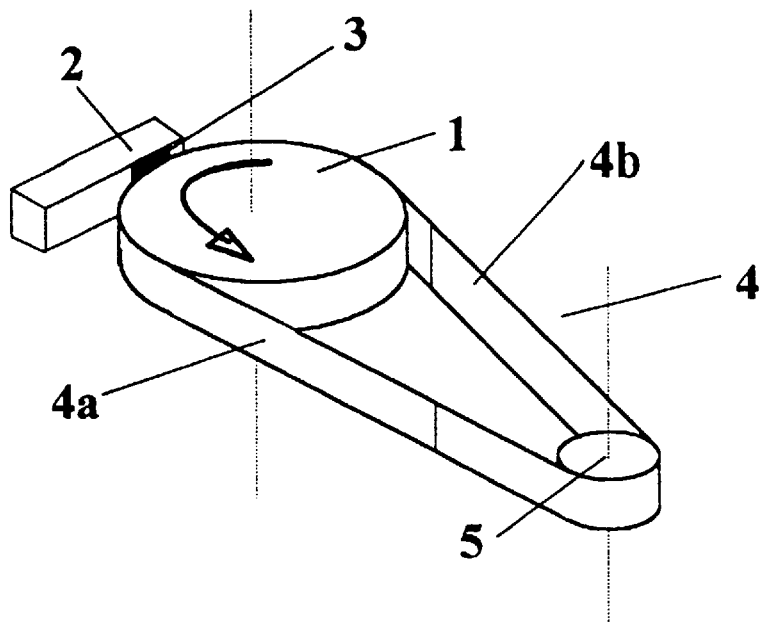
FIG. 1 shows an elevated side view of an arrangement for providing a surface of a bearing component with a pattern by electrochemical machining.

Referring to FIG. 1, an arrangement is shown suitable for providing a metal bearing component, here an inner bearing ring 1, with a pattern by electrochemical machining. To this end, an electrode 2 is provided, defining a gap 3 between said electrode 2 and the inner bearing ring 1. An electrolyte, for example a sodium nitrate solution as is well known in the art, can be supplied to the gap substantially tangentially to the surface of the bearing ring 1. To electrochemically machine the surface of the bearing ring 1 (that is, the race way of the bearing ring 1), a voltage is applied over the gap 3, causing current to pass across the gap 3, which is typically 100 µm. In this embodiment of the present invention, a belt 4 is pressed against the bearing ring 1, said belt 4 being provided with holes 6 which correspond to the desired pattern. The belt 4 is flexible and substantially prevents electrolyte from contacting the surface of the bearing ring 1 at those places where there are no holes 6. While some electrolyte may still reach the surface of parts of the bearing ring 1 not to be treated, this will not cause significant electrochemical machining if the thickness of the electrolyte is low enough due to the flexible character of the belt 4, resulting in a high resistance with concomitant low current densities and poor removal of metal ions from the surface of the bearing ring 1 by the electrolyte. The belt 4 has preferably hydrophobic properties at least at the side facing the bearing component. Moreover, the belt 4 is preferably non-abrasive to prevent damage to the surface to be treated. This may occur in case some slip of the belt 4 occurs along said surface or as a result of elements protruding from the belt towards the surface to be treated, said elements having a hardness sufficient to damage said surface.

The belt 4 may be driven by a capstan 5. The tension on the belt 4 is such that it rotates the freely rotatable bearing ring 1 substantially without any slip, ensuring an accurate electrochemical machining of the surface of said bearing ring 1. Of course, the belt 4 may be driven by the bearing ring 1 instead. In this description, the term "substantially without slip" is to be understood as no slip at all or any slip which is less than the dimension of the holes in the belt 4.

Slow rotation of the belt 4 will result in deeper patterns.

It goes without saying that a single belt 4 may be used to electrochemically machine more than one bearing ring 1 at a time.

Although in the embodiment shown in FIG. 1 a belt is used to mask those parts of the surface of the bearing ring 1 not to be electrochemically machined, a linear ribbon may be used instead. This ribbon may be reciprocated.

There are several ways to work the method according to the invention. The belt may be rotated many times to machine a single bearing ring 1. In such a case, the belt 4 is usually provided with relatively few holes, resulting in a pseudo-random texture on the race way. For example, if the density of holes in the belt is ¹/₁₀th of the density required on the object to be machined, any inadvertent overtreatment of a certain area of the object, will lead to a local density of just 1.1 instead of 1.

On the other hand, the belt 4 may be arranged to prevent some parts of the surface of the bearing ring 1 to be treated more than other parts. To this end the belt 4 may be comprised of at least one segment having a length equal to the circumference of the bearing ring 1 to be electrochemically machined, said segment having at its end zones without holes. Thus a belt 4 may comprise one holes-comprising segment 4a having a length equal to the circumference of the bearing ring 1 and another segment without holes 4b. When the bearing ring 1 is electrochemically machined, the bearing ring 1 is exposed to the segment without holes 4b followed by the holes-comprising segment 4a and again the same or another segment having no holes 4b.

Alternatively the belt 4 may comprise an indicator, for example a visual indicator such as a colored mark. An optic detecting means detects the moment when the visual indicator passes the detecting means and applies the voltage over the gap using a power supply, either for a predetermined time depending on the speed with which the belt 4 is moved and on the circumference of the bearing ring 1, or until the detecting means turns off the power supply upon detection of a corresponding visual indicator.

The belt 4 has to meet several requirements. Depending on the accuracy of the pattern desired it must have good dimensional stability. To obtain high-definition patterns the belt 4 must lack elastic properties. It must possess substantial non-conductive properties. Furthermore it must be flexible, capable of adapting to the shape of the metal bearing component to be machined. Its tensile strength should be sufficient to allow for the simultaneous movement of the bearing component and the belt (or ribbon) without slip.

Figure 2:
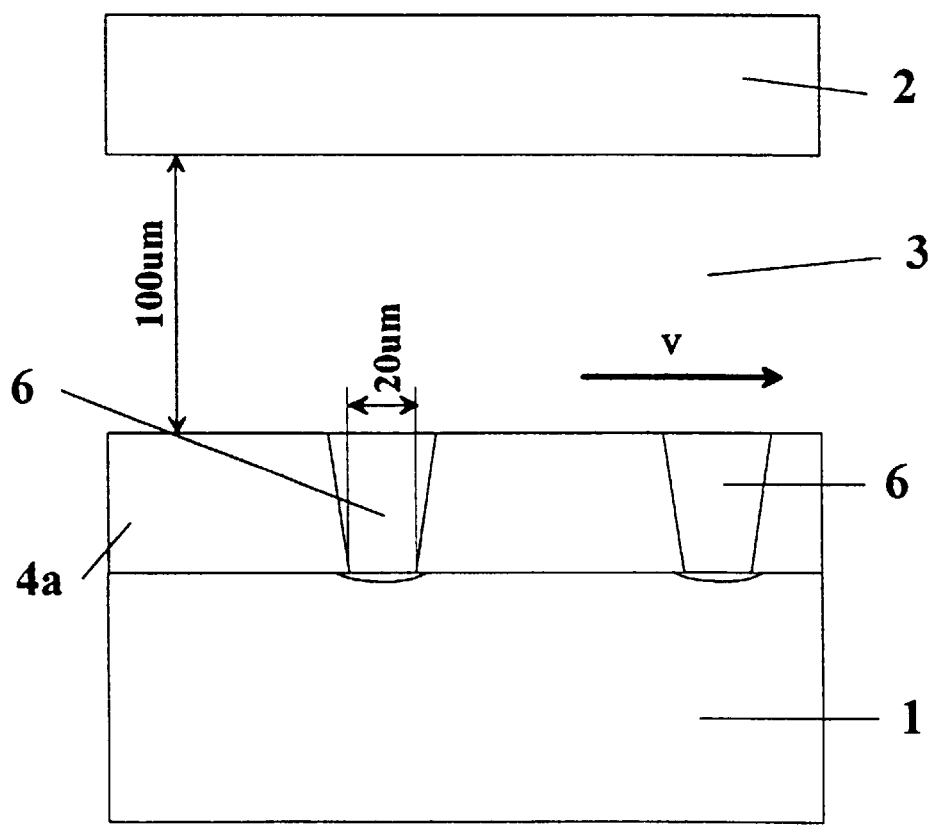
FIG. 2 shows a partial cross-sectional view of a ribbon used in the method according to the invention.

Good results were obtained using a polyethylene terephthalate (PET) film having a thickness of 50 µm. Using an excimer laser, the film was provided with tapered holes having a smallest width of 10 µm. The tapered shape (as shown in FIG. 2) allows for higher current densities and easier removal of metal ions by the electrolyte.

According to an alternative embodiment of the method according to the invention, a ribbon is used comprising a sandwich of a conductive film which is used as the electrode and a non-conductive film, with said non-conductive film facing and in contact with the metal bearing component.

Thus it is ensured that the electrode is at very close proximity to the bearing component, speeding up electrochemical machining, without any risk of the ribbon contacting the electrode and becoming damaged in the process.

The method according to the invention is especially suitable for providing inner bearing rings, cylindrical and needle roller elements and air bearing shafts with a texture. As inner bearing rings have a smaller diameter than outer bearing rings, they experience heavier loads and are consequently more likely to fail. Thus it is more important to improve the surface of inner bearing rings with a texture, ensuring adequate lubrication, than the surface of outer bearing rings, which is somewhat more difficult to machine using the method according to the present invention. It can however be done using means, such as a (rotatable) electrode, to press the ribbon against the surface of the outer bearing ring.

What is claimed is:

1. A method for electrochemically machining a texture on a metal bearing component, comprising the steps of:
   passing a current across a narrow gap formed between the metal bearing component and an electrode;
   supplying electrolyte to the gap; providing a ribbon between the electrode and the metal bearing component, said ribbon being made of a flexible, substantially non-conductive material with holes defined therein, a portion of the length of the ribbon is in direct contact with the metal bearing component so as to define a contact zone; and
   passing the current across the gap.

2. A method according to claim 1, wherein the metal bearing component is rotatable about an axis while said ribbon, at the contact zone, moves at the same speed and in the same direction as the metal bearing component.

3. A method according to claim 1, wherein said ribbon has at least two segments, a first segment substantially free of holes, and a second segment adjacent to said first segment and having holes, said second segment having a length equal to or a multiple of the circumference of the metal bearing component.

4. A method according to claim 1, further comprising:
   generating, by a detector, an output signal, depending on the position of an indicator on the ribbon; and
   controlling a current passing over the gap based on the output signal.

5. A method according to claim 4, wherein said indicator is a colored mark.

6. A method according to claim 4, wherein said detector is an optic detector.

7. A method according to claim 1, wherein said ribbon is made of plastic having a tensile strength sufficient to allow for simultaneous movement of the bearing component and the ribbon without slip.

8. A method according to claim 1, wherein said ribbon has holes defined therein, each hole being narrow at the side of the bearing component and wide at the opposite side.

9. A method according to claim 1, wherein said ribbon includes a conductive film as the electrode and a non-conductive film facing the metal bearing component.

10. A method according to claim 1, wherein said ribbon is an endless belt.

11. A method according to claim 1, wherein said rotatable mount is one of a bearing ring, a roller element, and a shaft of a dynamic pressure bearing.

12. An apparatus for electrochemically treating a metal piece to produce a surface texture on the metal piece, comprising: an electrode; means for supplying electrolyte; a rotatable mount for supporting the metal piece; and a ribbon including a substantially non-conductive material facing so as to contact the metal piece, said ribbon having holes over at least a portion of its length, through which the electrolyte contacts the metal piece and permits current flow between the metal piece and said electrode.

13. An apparatus according to claim 12, wherein said rotatable mount is one of a bearing ring, a roller element, and a shaft of a dynamic pressure bearing.

* * * * *